US011415751B2

(12) United States Patent
Gregg et al.

(10) Patent No.: US 11,415,751 B2
(45) Date of Patent: Aug. 16, 2022

(54) FREE SPACE COUPLING OF AN AIMING BEAM USING TAPERED OR GRATED CLADDING

(71) Applicant: Lumentum Operations LLC, San Jose, CA (US)

(72) Inventors: Jeff Gregg, San Jose, CA (US); Xiang Peng, San Ramon, CA (US); Richard D. Faulhaber, San Carlos, CA (US); Patrick Gregg, Sunnyvale, CA (US)

(73) Assignee: Lumentum Operations LLC, San Jose, CA (US)

( * ) Notice: Subject to any disclaimer, the term of this patent is extended or adjusted under 35 U.S.C. 154(b) by 9 days.

(21) Appl. No.: 17/167,885

(22) Filed: Feb. 4, 2021

(65) Prior Publication Data
US 2022/0196917 A1 Jun. 23, 2022

Related U.S. Application Data

(60) Provisional application No. 63/127,000, filed on Dec. 17, 2020.

(51) Int. Cl.
*G02B 6/32* (2006.01)
*F21V 8/00* (2006.01)
*H01S 3/067* (2006.01)

(52) U.S. Cl.
CPC .......... *G02B 6/322* (2013.01); *G02B 6/0028* (2013.01); *G02B 6/327* (2013.01); *H01S 3/06704* (2013.01)

(58) Field of Classification Search
CPC ...... G02B 6/322; G02B 6/0028; G02B 6/327; H01S 3/06704
See application file for complete search history.

(56) References Cited

U.S. PATENT DOCUMENTS

| | | | |
|---|---|---|---|
| 10,603,744 B2 * | 3/2020 | Ye | C03C 25/12 |
| 11,054,576 B2 * | 7/2021 | Wang | G01N 21/6486 |
| 2016/0363728 A1 * | 12/2016 | Wang | G02B 6/124 |
| 2019/0193196 A1 * | 6/2019 | Ye | C03C 25/105 |
| 2020/0049882 A1 * | 2/2020 | Wang | G02B 6/124 |
| 2021/0033788 A1 * | 2/2021 | Wang | G02B 6/34 |

\* cited by examiner

*Primary Examiner* — Andrew Jordan
(74) *Attorney, Agent, or Firm* — Harrity & Harrity, LLP

(57) ABSTRACT

An optical fiber includes a core configured to transmit laser light and a cladding that surrounds the core. In some implementations, an outer surface region of the cladding is tapered or comprises a plurality of notches. The outer surface region of the cladding is configured to cause an aiming beam that falls incident upon the outer surface region of the cladding at a first incidence angle to fall incident upon an outer surface region of the core at a second incidence angle to allow the aiming beam to couple into the core.

20 Claims, 10 Drawing Sheets

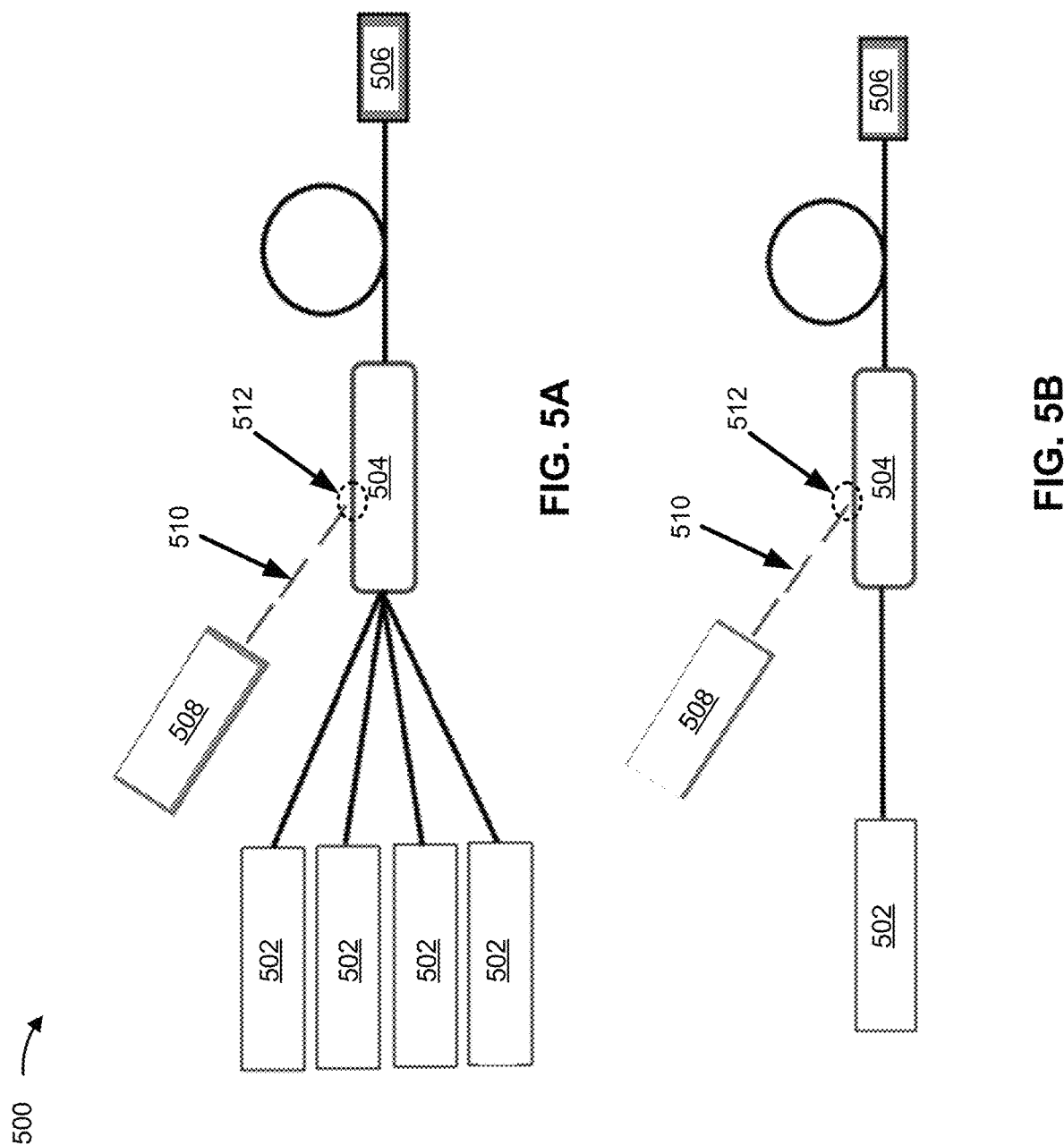

FREE SPACE COUPLING OF AN AIMING BEAM USING TAPERED OR GRATED CLADDING

RELATED APPLICATION

This application claims priority to U.S. Provisional Patent Application No. 63/127,000, filed on Dec. 17, 2020, and entitled "SYSTEM FOR FREE SPACE COUPLING OF AN AIMING BEAM," the content of which is incorporated by reference herein in its entirety.

TECHNICAL FIELD

The present disclosure relates generally to coupling an aiming beam (e.g., a beam of light at a wavelength in the visible spectrum) from an aiming beam fiber to an optical fiber in order to facilitate aiming of a laser output of the optical fiber.

BACKGROUND

A high-power fiber laser is a fiber laser capable of delivering a relatively high output power. For example, the output power of a high-power fiber laser may be in a range from tens of watts to several kilowatts. A high-power fiber laser includes one or more optical devices that enable the high-power fiber laser to deliver this relatively high output power. For example, the high-power fiber laser can include a fiber optic beam combiner that receives multiple optical inputs from multiple laser modules (e.g., via respective input fibers) and combines these multiple optical inputs to form an optical output in a single output fiber (e.g., such that the optical power from the multiple optical inputs is combined in the optical output).

SUMMARY

In some implementations, an optical fiber includes a core configured to transmit laser light; and a cladding that surrounds the core, wherein: an outer surface region of the cladding is tapered, and wherein the outer surface region of the cladding is configured to: cause an aiming beam that falls incident upon the outer surface region of the cladding at a first incidence angle to fall incident upon an outer surface region of the core at a second incidence angle to allow the aiming beam to couple into the core.

In some implementations, an optical fiber includes a core configured to transmit laser light; and a cladding that surrounds the core, wherein: an outer surface region of the cladding comprises a plurality of notches arranged in a periodic pattern, and wherein the outer surface region of the cladding is configured to: cause an aiming beam that falls incident upon the outer surface region of the cladding at a first incidence angle to fall incident upon an outer surface region of the core at a second incidence angle to allow the aiming beam to couple into the core.

In some implementations, an optical fiber system includes one or more input optical fibers; a transmission optical fiber; an output optical fiber; an aiming beam fiber; an aiming beam entrance region; and an optical element, wherein: the one or more input optical fibers are configured to cause one or more input beams to propagate to the transmission optical fiber via respective cores of the one or more input optical fibers; the transmission optical fiber is configured to cause the one or more input beams to propagate as a transmission beam to the output optical fiber via a core of the transmission optical fiber; the output optical fiber is configured to cause the transmission beam to propagate to an emission end of the output optical fiber via a core of the output optical fiber; the aiming beam fiber is configured to emit an aiming beam at the aiming beam entrance region via the optical element; the optical element is configured to focus the aiming beam on the aiming beam entrance region; and the aiming beam entrance region is tapered or comprises a plurality of notches arranged in a periodic pattern, wherein the aiming beam entrance region is configured to cause the aiming beam to couple into at least one of the respective cores of the one or more input optical fiber, the core of the transmission optical fiber, or the core of the output optical fiber to allow the aiming beam to propagate to the emission end of the output optical fiber.

BRIEF DESCRIPTION OF THE DRAWINGS

FIGS. 5A-5F are diagrams of an example optical fiber system described herein.

DETAILED DESCRIPTION

Figure 1A:
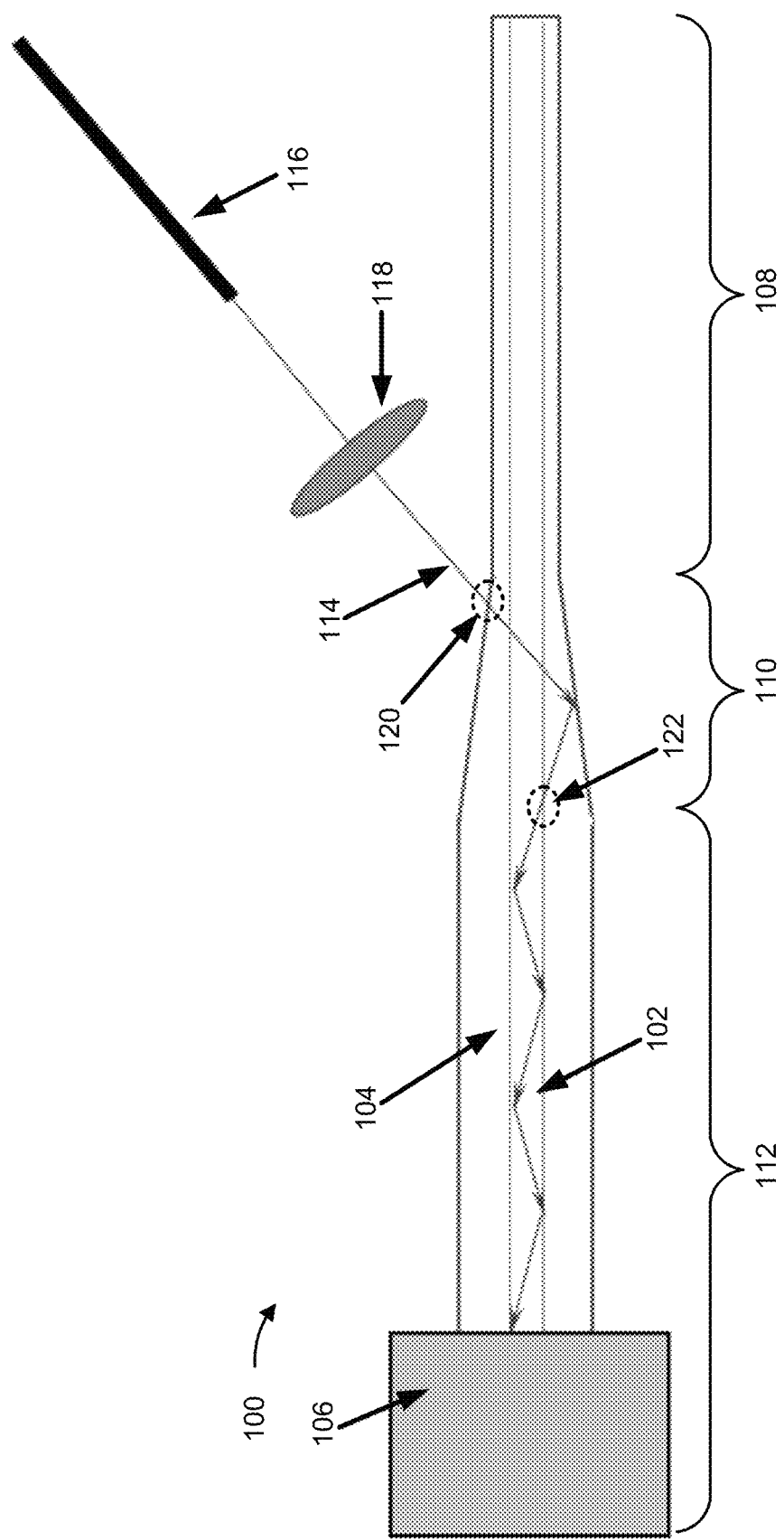
FIGS. 1A-1B are diagrams of an example optical fiber described herein.

The following detailed description of example implementations refers to the accompanying drawings. The same reference numbers in different drawings may identify the same or similar elements.

A high-power fiber laser (e.g., a class IV fiber laser) may operate in a spectral region that is outside of the visible spectrum and thus is invisible to the human eye. For example, an ytterbium-doped fiber laser operates at a wavelength of approximately 1 micron (μm), which is invisible to the human eye. This can be problematic when the fiber laser is to be used in a material processing application (e.g., cutting, engraving, marking, welding, and/or the like) because a laser output needs to be aimed at a desired location during the material processing. Here, since the laser output is not visible to the human eye, accurate aiming of the laser output is difficult or impossible. In order to address this issue, a low-power laser (e.g., a class I laser) in the visible spectrum (herein referred to as an aiming beam) can be coupled to a fiber laser so that the laser output includes the laser beam and at least a portion of the aiming beam. Here, the portion of the aiming beam causes the laser output to be visible, thereby enabling aiming.

In some cases, external coupling of the aiming beam to the fiber laser can be achieved. In such cases, the laser beam and the aiming beam, both in free space, are collimated by one or more lenses, and a dichroic mirror is used to combine the aiming beam and the laser beam. Another lens then focuses the combined beam back into an output fiber. However, this free space optics approach is complex and difficult to manufacture since multiple free space optical components need to be arranged and aligned with a high degree of accuracy. Furthermore, this free space optics approach is optically inefficient and, therefore, is not desirable in practice.

In some cases, coupling the aiming beam to the fiber laser can be achieved using a fused fiber combiner. In such a case, an aiming beam fiber and a laser beam fiber are heated while being stretched in order to create fibers that are fused together. In operation, an aiming beam can be coupled to the laser beam fiber through a region in which the aiming beam fiber and the laser beam fiber are fused together. However, a fused fiber combiner is complex and difficult to manufacture and causes power loss, beam quality degradation, and heating problems, thereby degrading performance of the fiber laser. For example, fusing the aiming beam fiber and the laser beam fiber may result in a perturbation to a core of the laser beam fiber (where the high-power laser is confined) and thereby cause a power loss to the laser beam, which may critically degrade a performance of the laser beam, particularly in the case of a kilowatt (kW) fiber laser.

In some cases, coupling the aiming beam to the fiber laser can be achieved using a side-coupling structure. The side-coupling structure may allow for side contact between an uncoated aiming beam fiber and an uncoated feeding fiber to allow coupling of an aiming beam with a laser beam. However, a side-coupling structure, while comparatively less complex and less difficult to manufacture (e.g., as compared to the free space optics and fused fiber combiner approaches described above) requires an assembly process (e.g., that includes gluing, packaging, and/or the like) to allow and/or maintain the side contact between the aiming beam fiber and the feeding fiber. Further, a side-coupling structure does not allow for an aiming beam to couple into a core of the feeding fiber.

Some implementations described herein provide free space coupling of an aiming beam into a core of an optical fiber without disturbing propagation of a laser beam within the core of the optical fiber to allow aiming of the laser beam. In some implementations, free space coupling of the aiming beam into the core of the optical fiber is achieved when an outer surface region of a cladding of the optical fiber is tapered and/or comprises a plurality of notches arranged in a periodic pattern. For example, the outer surface region of the cladding may cause an aiming beam that falls incident upon the outer surface region of the cladding at a first incidence angle to fall incident upon an outer surface region of the core of the optical fiber at a second incidence angle to allow the aiming beam to couple into the core. In some implementations, the outer surface region of the core may be tapered to facilitate coupling of the aiming beam into the core.

In this way, some implementations described herein allow for coupling of an aiming beam into the core of an optical fiber without a dedicated optical coupler and/or modifying a configuration of the optical fiber. This reduces a complexity of the optical fiber, as compared to conventional aiming beam coupling techniques described above, and therefore is less difficult and/or costly to manufacture. Further, some implementations described herein allow coupling of an aiming beam without affecting a performance of the optical fiber. This therefore prevents or reduces power loss issues, beam quality degradation, heating problems (e.g., that can perturb a core of signal fiber), and/or the like that can result from using conventional aiming beam coupling techniques. Thus, some implementations described herein ensure that there is no loss applied to a laser beam, which is critical especially for high-power fiber laser systems.

Figure 1B:
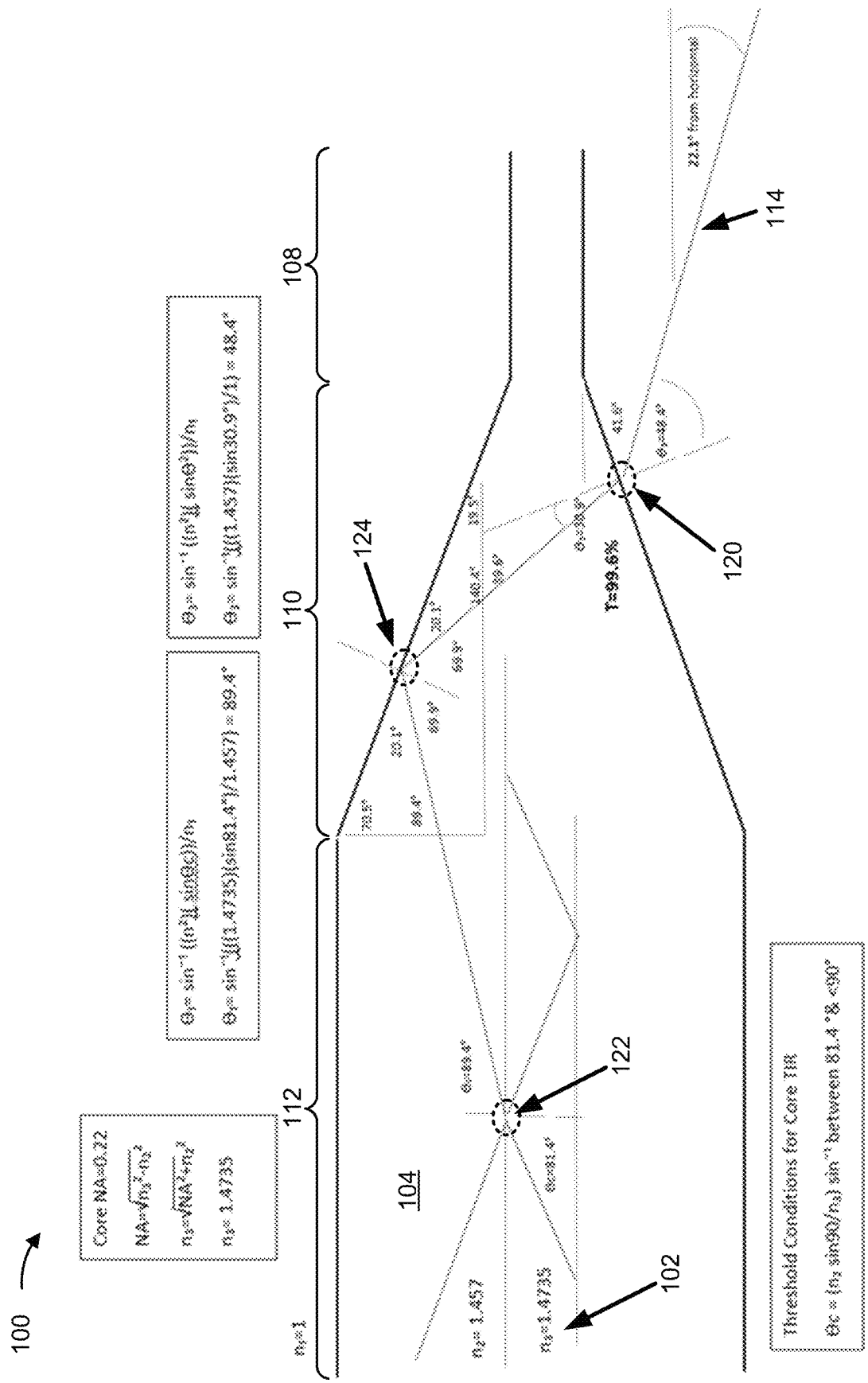

FIGS. 1A-1B are diagrams of an example optical fiber 100 described herein. In some implementations, the optical fiber 100 may propagate laser light, such as a high-power beam associated with a kW laser, that is to be used in a material processing application, such as cutting, welding, engraving, marking, and/or the like. As shown in FIG. 1A, the optical fiber 100 may include a core 102, a cladding 104, and/or a fiber jacket 106. The core 102 may comprise glass and/or another suitable material configured to transmit the laser light (e.g., from an input end of the optical fiber 100 to an output end of the optical fiber 100). The cladding 104 may surround (e.g., circumferentially surround) the core 102 and may be configured to confine the laser light (e.g., within the core 102). The fiber jacket 106 may surround (e.g., circumferentially surround) the cladding 104 and may comprise a material (e.g., a plastic material, such as polyethylene) that is configured to protect and/or shield the core 102 and/or the cladding 104.

As further shown in FIG. 1A, the optical fiber 100 may include an input end region 108, an aiming beam entrance region 110, and an output end region 112. Laser light may propagate within the core 102 from the input end region 108 to the output end region 112 via the aiming beam entrance region 110. The aiming beam entrance region 110 may be configured to cause an aiming beam 114 to couple into the core 102, as described in further detail herein.

An aiming beam fiber 116 may be an optical fiber that is configured to emit the aiming beam 114 at the aiming beam entrance region 110. The aiming beam 114 may be a free space beam in the visible spectrum (e.g., with a comparatively lower power than the high-power beam described above). In some implementations, the aiming beam fiber 116 may be configured to emit the aiming beam 114 at the aiming beam entrance region 110 via an optical element 118. The optical element 118 may comprise a lens or a similar optical element configured to direct and/or focus the aiming beam 114 on the aiming beam entrance region 110.

As further shown in FIG. 1A, the aiming beam entrance region 110 may comprise an outer surface region 120 of the cladding 104. In some implementations, the aiming beam entrance region 110 and/or the outer surface region 120 may be tapered at a taper angle. For example, as shown in FIG. 1A, a diameter of the cladding 104 may be at a maximum at a position on the cladding 104 associated with the output end region 112 and may progressively decrease (e.g., corresponding to the taper angle) at one or more positions on the cladding 104 associated with the aiming beam entrance region 110 that are farther away from the output end region 112, with the diameter at a minimum at a position on the cladding 104 associated with the input end region 108. In some implementations, the cladding 104 may be etched (e.g., using one or more etching procedures) to cause the aiming beam entrance region 110 and/or the outer surface region 120 to be tapered at the taper angle.

As further shown in FIG. 1A, the aiming beam 114 may emit from the aiming beam fiber 116 and may transmit (e.g., in free space) to the optical element 118, which may direct and/or focus the aiming beam 114 on the outer surface region 120 of the aiming beam entrance region 110. Accordingly, the aiming beam 114 may fall incident upon the aiming beam entrance region 110 and/or the outer surface region 120 at a first incidence angle.

When the first incidence satisfies (e.g., is less than or equal to) a first incidence angle threshold, the aiming beam entrance region 110 and/or the outer surface region 120 (e.g., when tapered at the taper angle) may cause the trajectory of the aiming beam 114 to change to allow the aiming beam 114 to enter into the cladding 104. This may cause the aiming beam 114 to propagate through the cladding 104 from the outer surface region 120 of the cladding 104 to an outer surface region 122 of the core 102. For example, as shown in FIG. 1A, the aiming beam 114 may indirectly propagate through the cladding 104 from the outer surface region 120 of the cladding 104 to the outer surface region 122 of the core 102 by reflecting off one or more internal surface regions of the cladding 104. The aiming beam 114, after propagating through the cladding 104, may fall incident upon the outer surface region 122 of the core 102 at a second incidence angle. When the second incidence angle satisfies (e.g., is less than or equal to) a second incidence angle threshold, the aiming beam 114 may couple into the core 102. For example, the aiming beam 114 may enter the core 102 (e.g., via the outer surface region 122) and may propagate within the core 102 with a propagation loss that satisfies (e.g., is less than or equal to) a propagation loss threshold (e.g., a leaky mode threshold).

In this way, the aiming beam 114 may be coupled into the core 102 to allow the aiming beam 114 to be transmitted via the core 102 with laser light (e.g., a high power beam) to an output end of the optical fiber 100. The aiming beam 114, along with the laser light, may emit from the output end of the optical fiber 100, which facilitates aiming of the laser light (e.g., since the laser light will include light in the visible spectrum). This can improve safety, precision, efficiency, and/or the like associated with using the optical fiber 100 in the material processing application.

FIG. 1B shows an example of the aiming beam 114 indirectly coupling into the core 102 when a refractive index associated with air ($n_1$) surrounding the optical fiber 100 is 1, a refractive index associated with the cladding 104 ($n_2$) is 1.457, and a refractive index associated with the core 102 ($n_3$) is 1.4735. Accordingly, the core 102 may have a numerical aperture (NA) of 0.22 and a laser beam (e.g., an aiming beam, a high-power beam, and/or the like) may propagate through the core 102 when the laser beam falls incident on inner surface regions of the core 102 at angles approximately 81.4° to 90° (referred to as a total internal reflection (TIR) range). As further shown in FIG. 1B, the aiming beam entrance region 110 may be tapered at a taper angle of 19.5° (e.g., 70.5° from a normal line associated with a portion of an outer surface of the cladding 104 at the output end region 112 of the optical fiber 100).

As further shown in FIG. 1B, the aiming beam 114 may transmit in free space at approximately 22.1° from horizontal (e.g., which is parallel, within a tolerance, to a portion of an outer surface of the cladding 104 at the input end region 108 or the output end region 112 of the optical fiber 100) and may fall incident upon the outer surface region 120 of the aiming beam entrance region 110 at an incidence angle of 41.6° (e.g., 48.4° from a normal line associated with the outer surface region 120, shown in FIG. 1B as $\theta_3$). A portion (e.g., 99.6%) of the aiming beam 114 may enter the cladding 104 and may bend (e.g., may refract due a difference between $n_1$ and $n_2$) such that the aiming beam 114 may propagate through the cladding 104 at a first propagation angle of 30.9° from the normal line associated with the outer surface region 120 (shown in FIG. 1B as $\theta_2$). The aiming beam 114 may propagate through the cladding 104 to an inner surface region 124 of the aiming beam entrance region 110, which may be configured to reflect the aiming beam 114 to the core 102. The aiming beam 114 may fall incident upon the inner surface region 124 at an incidence angle of 20.1° (e.g., 69.9° from a normal line associated with the inner surface region 124) and may propagate through the cladding 104 at a second propagation angle of 69.9° from the normal line associated with the inner surface region 124 (also shown in FIG. 1B as 20.1° from the inner surface region 124 and 89.4° from a normal line associated with a portion of an outer surface of the cladding 104 at the output end region 112 of the optical fiber 100). The aiming beam 114 may propagate through the cladding 104 to the outer surface region 122 of the core 102 and may fall incident upon the outer surface region 122 at an incidence angle of 89.4°. As further shown in FIG. 1B, the aiming beam 114 may enter the core 102 and may bend (e.g., refract due a difference between $n_3$ and $n_2$) such that the aiming beam 114 may reflect within the core 102 at a reflection angle of 81.4° (e.g., near the TIR range described above). This may allow the aiming beam 114 to couple into the core and propagate within the core 102 with a propagation loss that satisfies (e.g., is less than or equal to) a propagation loss threshold (e.g., a leaky mode threshold).

As indicated above, FIGS. 1A-1B are provided as an example. Other examples may differ from what is described with regard to FIGS. 1A-1B.

Figure 2A:
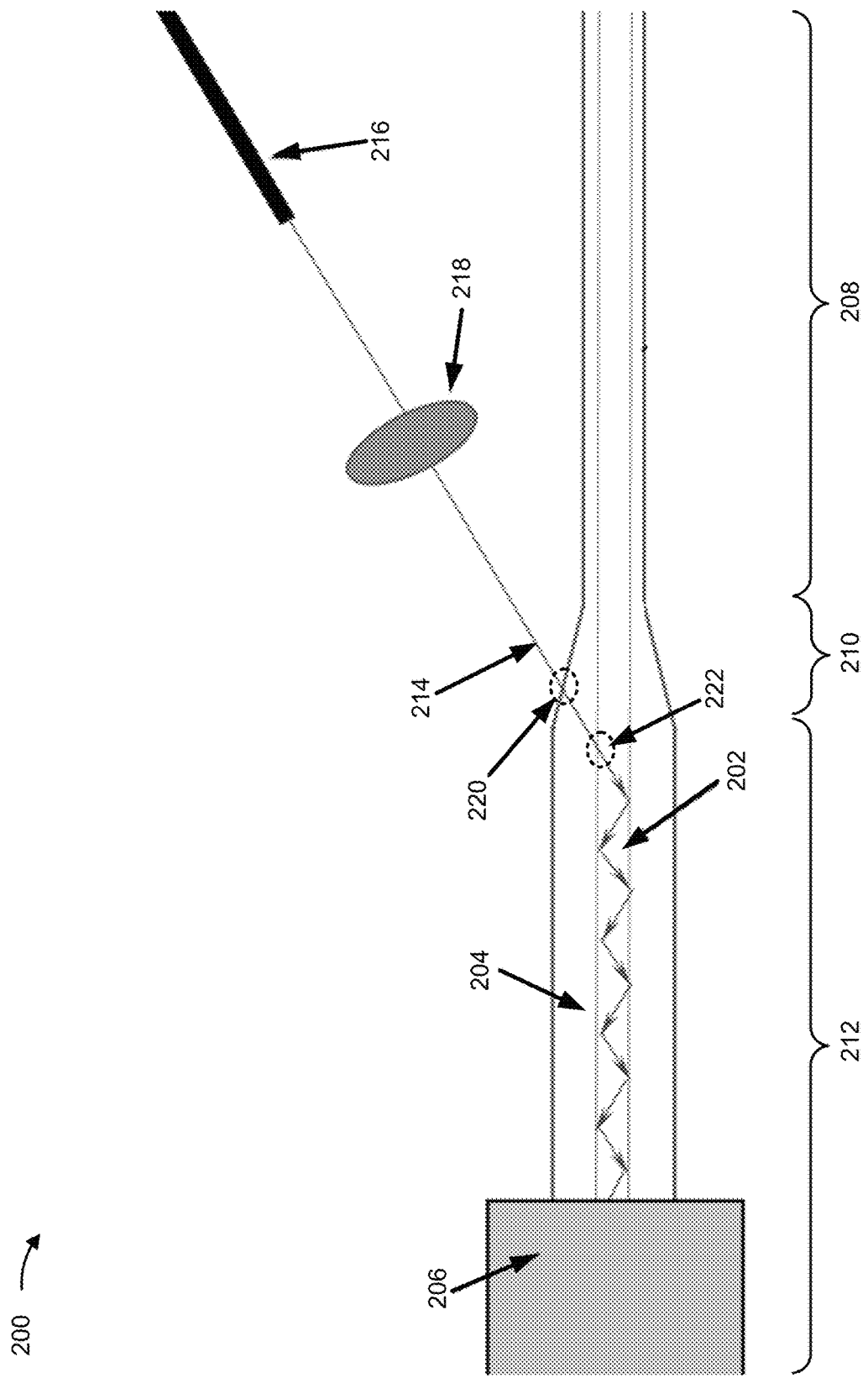
FIGS. 2A-2B are diagrams of an example optical fiber described herein.
Figure 2B:
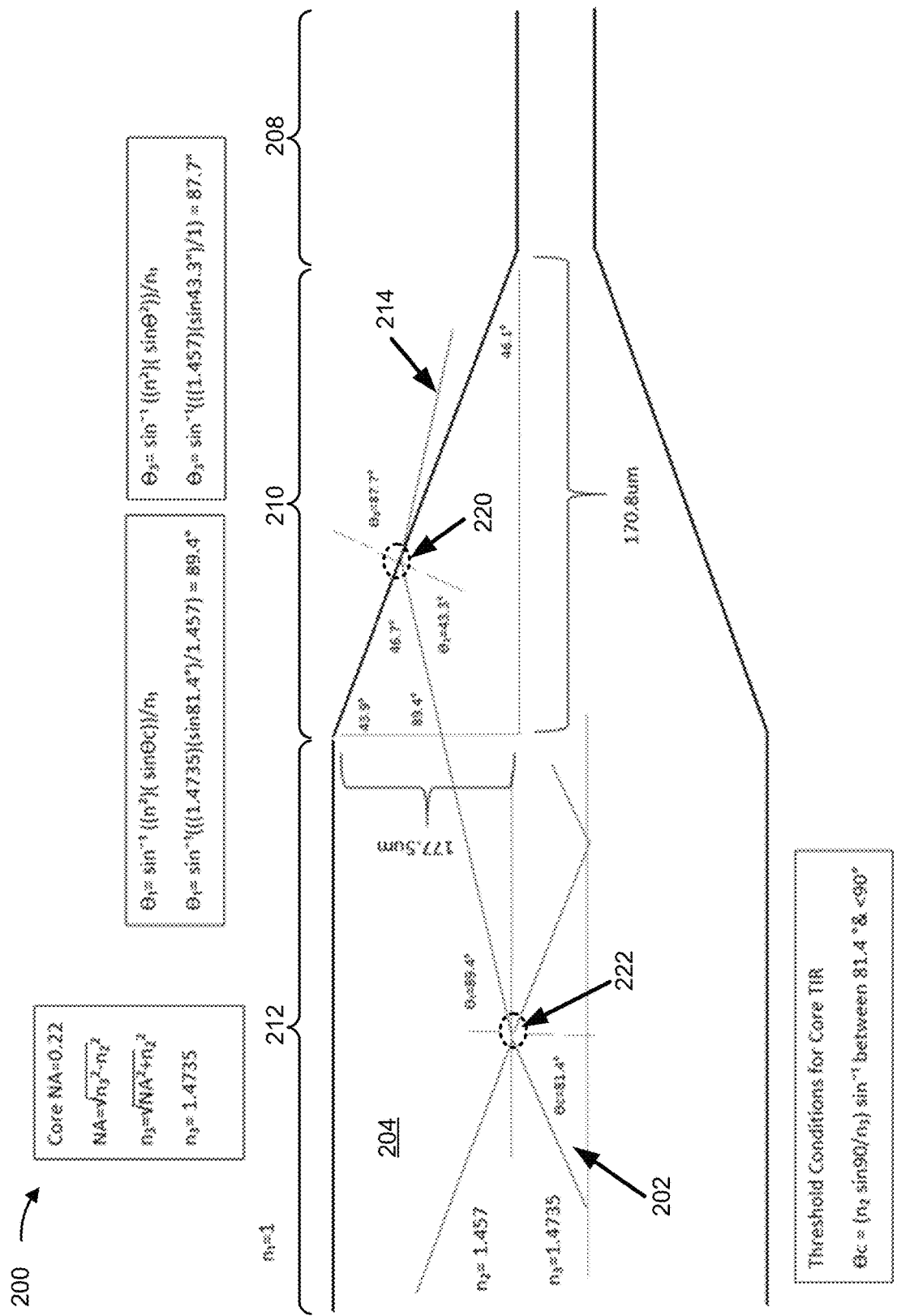

FIGS. 2A-2B are diagrams of an example optical fiber 200 described herein. In some implementations, the optical fiber 200 may propagate laser light (e.g., in a similar manner as the optical fiber 100 described herein in relation to FIGS. 1A-1B). As shown in FIG. 2A, the optical fiber 200 may include a core 202, a cladding 204, and/or a fiber jacket 206 that may respectively be the same as, or similar to, the core 102, the cladding 104, and/or the fiber jacket 106 described herein in relation to FIGS. 1A-1B. As further shown in FIG. 2A, the optical fiber 200 may include an input end region 208, an aiming beam entrance region 210, and an output end region 212. Laser light may propagate within the core 202 from the input end region 208 to the output end region 212 via the aiming beam entrance region 210. The aiming beam entrance region 210 may be configured to cause an aiming beam 214 to couple into the core 202, as described in further detail herein.

An aiming beam fiber 216 (that is the same as, or similar to, the aiming beam fiber 116 described herein in relation to FIGS. 1A-1B) may be an optical fiber that is configured to emit the aiming beam 214 at the aiming beam entrance region 210. The aiming beam 214 may be a free space beam in the visible spectrum (e.g., that is the same as, or similar to, the aiming beam 114). In some implementations, the aiming beam fiber 216 may be configured to emit the aiming beam 214 at the aiming beam entrance region 210 via an optical element 218. The optical element 218 (e.g., that is the same as, or similar to, the optical element 218 described herein in relation to FIGS. 1A-1B) may comprise a lens or a similar optical element configured to direct and/or focus the aiming beam 214 on the aiming beam entrance region 210.

As further shown in FIG. 2A, the aiming beam entrance region 210 may comprise an outer surface region 220 of the cladding 204. In some implementations, the aiming beam entrance region 210 and/or the outer surface region 220 may be tapered at a taper angle (e.g., in a same, or similar, manner as the aiming beam entrance region 110 and/or the outer surface region 120 described herein in relation to FIGS. 1A-1B). For example, as shown in FIG. 2A, a diameter of the cladding 204 may be at a maximum at a position on the cladding 204 associated with the output end region 212 and may progressively decrease (e.g., corresponding to the taper angle) at one or more positions on the cladding 204 associated with the aiming beam entrance region 210 that are farther away from the output end region 212, with the diameter at a minimum at a position on the cladding 204 associated with the input end region 208. In some implementations, the cladding 204 may be etched (e.g., using one or more etching procedures) to cause the aiming beam entrance region 210 and/or the outer surface region 220 to be tapered at the taper angle.

As further shown in FIG. 2A, the aiming beam 214 may emit from the aiming beam fiber 216 and may transmit (e.g., in free space) to the optical element 218, which may direct and/or focus the aiming beam 214 on the outer surface region 220 of the aiming beam entrance region 210. Accordingly, the aiming beam 214 may fall incident upon the aiming beam entrance region 210 and/or the outer surface region 220 at a first incidence angle.

When the first incidence satisfies (e.g., is less than or equal to) a first incidence angle threshold, the aiming beam entrance region 210 and/or the outer surface region 220 (e.g., when tapered at the taper angle) may cause the trajectory of the aiming beam 214 to change to allow the aiming beam 214 to enter into the cladding 204. This may cause the aiming beam 214 to propagate through the cladding 204 from the outer surface region 220 to an outer surface region 222 of the core 202. For example, as shown in FIG. 2A, the aiming beam 214 may directly propagate through the cladding 204 from the outer surface region 220 of the cladding 204 to the outer surface region 222 of the core 202 without reflecting off one or more internal surface regions of the cladding 204. The aiming beam 214, after propagating through the cladding 204, may fall incident upon the outer surface region 222 or the core 202 at a second incidence angle. When the second incidence angle satisfies (e.g., is less than or equal to) a second incidence angle threshold, the aiming beam 214 may couple into the core 202. For example the aiming beam 214 may enter the core 202 (e.g., via the outer surface region 222) and may propagate within the core 202 with a propagation loss that satisfies (e.g., is less than or equal to) a propagation loss threshold (e.g., a leaky mode threshold).

In this way, the aiming beam 214 may be coupled into the core 202 to allow the aiming beam 214 to be transmitted via the core 202 with laser light (e.g., a high power beam) to an output end of the optical fiber 200. The aiming beam 214, along with the laser light, may emit from the output end of the optical fiber 200, which facilitates aiming of the laser light (e.g., since the laser light will include light in the visible spectrum). This can improve safety, precision, efficiency, and/or the like associated with using the optical fiber 200 in the material processing application.

FIG. 2B shows an example of the aiming beam 214 directly coupling into the core 202 when a refractive index associated with air ($n_1$) surrounding the optical fiber 200 is 1, a refractive index associated with the cladding 204 ($n_2$) is 1.457, and a refractive index associated with the core 202 ($n_3$) is 1.4735. Accordingly, the core 202 may have an NA of 0.22 and a laser beam (e.g., an aiming beam, a high-power beam, and/or the like) may propagate through the core 202 when the laser beam falls incident on inner surface regions of the core 202 at angles approximately 81.4° to 90° (referred to as a TIR range). As further shown in FIG. 2B, the aiming beam entrance region 210 may be tapered at a taper angle of 46.1° (e.g., 43.9° from a normal line associated with a portion of an outer surface of the cladding 204 at the output end region 212 of the optical fiber 200).

As further shown in FIG. 2B, the aiming beam 214 may fall incident upon the outer surface region 220 of the aiming beam entrance region 210 at an incidence angle of 2.3° (e.g., 87.7° from a normal line associated with the outer surface region 220, shown in FIG. 2B as $\theta_3$). A portion of the aiming beam 214 may enter the cladding 204 and may bend (e.g., may refract due a difference between $n_1$ and $n_2$) such that the aiming beam 214 may propagate through the cladding 204 at a propagation angle of 43.3° from the normal line associated with the outer surface region 220 (shown in FIG. 2B as $\theta_2$). The aiming beam 214 may propagate through the cladding 204 to the outer surface region 222 of the core 202 and may fall incident upon the outer surface region 222 at an incidence angle of 89.4°. As further shown in FIG. 2B, the aiming beam 214 may enter the core 202 and may bend (e.g., refract due a difference between $n_3$ and $n_2$) such that the aiming beam 214 may reflect within the core 202 at a reflection angle of 81.4° (e.g., near the TIR range described above). This may allow the aiming beam 214 to couple into the core and propagate within the core 202 with a propagation loss that satisfies (e.g., is less than or equal to) a propagation loss threshold (e.g., a leaky mode threshold).

As indicated above, FIGS. 2A-2B are provided as an example. Other examples may differ from what is described with regard to FIGS. 2A-2B.

Figure 3:
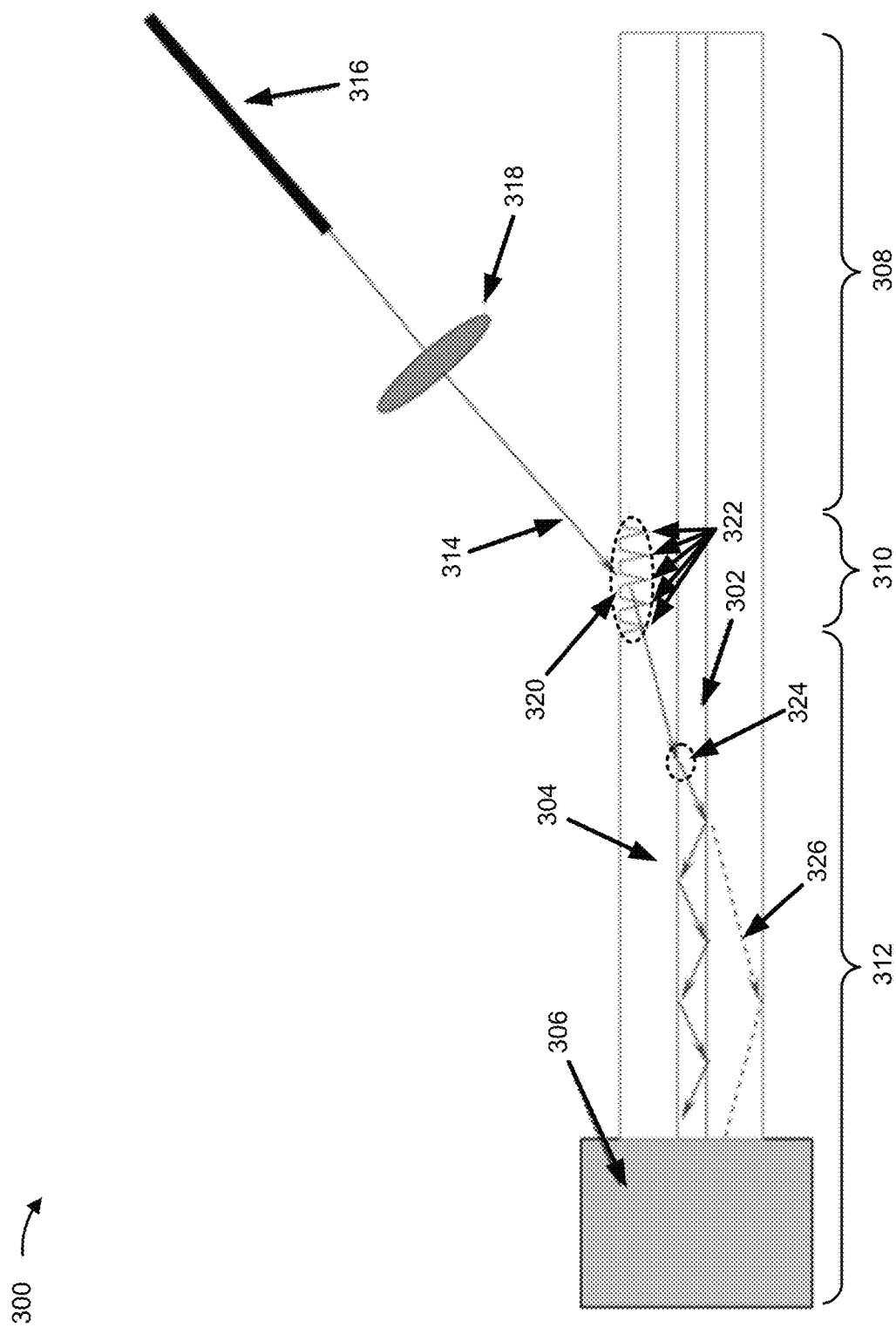
FIG. 3 is a diagram of an example optical fiber described herein.

FIG. 3 is a diagram of an example optical fiber 300 described herein. In some implementations, the optical fiber 300 may propagate laser light (e.g., in a similar manner as the optical fiber 100 described herein in relation to FIGS. 1A-1B). As shown in FIG. 3, the optical fiber 300 may include a core 302, a cladding 304, and/or a fiber jacket 306 that may respectively be the same as, or similar to, the core 102, the cladding 104, and/or the fiber jacket 106 described herein in relation to FIGS. 1A-1B. As further shown in FIG. 3, the optical fiber 300 may include an input end region 308, an aiming beam entrance region 310, and an output end region 312. Laser light may propagate within the core 302 from the input end region 308 to the output end region 312 via the aiming beam entrance region 310. The aiming beam entrance region 310 may be configured to cause an aiming beam 314 to couple into the core 302, as described in further detail herein.

An aiming beam fiber 316 (that is the same as, or similar to, the aiming beam fiber 116 described herein in relation to FIGS. 1A-1B) may be an optical fiber that is configured to emit the aiming beam 314 at the aiming beam entrance region 310. The aiming beam 314 may be a free space beam in the visible spectrum (e.g., that is the same as, or similar to, the aiming beam 114). In some implementations, the aiming beam fiber 316 may be configured to emit the aiming beam 314 at the aiming beam entrance region 310 via an optical element 318. The optical element 318 (e.g., that is the same as, or similar to, the optical element 318 described herein in relation to FIGS. 1A-1B) may comprise a lens or a similar optical element configured to direct and/or focus the aiming beam 314 on the aiming beam entrance region 310.

As further shown in FIG. 3, the aiming beam entrance region 310 may comprise an outer surface region 320 of the cladding 304. In some implementations, the aiming beam entrance region 310 and/or the outer surface region 320 may comprise a plurality of notches 322. The plurality of notches 322 may be arranged in a periodic pattern with a period of approximately 10 to 1000 microns (e.g., the period is greater than or equal to 10 microns and less than or equal to 1000 microns). In some implementations, the plurality of notches 322 may act as a transmission grating or may be otherwise configured to bend the aiming beam 314 as the aiming beam 314 enters the cladding 304 via the aiming beam entrance region 310 and/or the outer surface region 320. When the plurality of notches 322 act as a transmission grating, a performance of the plurality of notches 322 may be represented by the equation: a[sin($\theta_m$)−sin($\theta_i$)]=mλ, where a is the period of the transmission grating, m is an integer, $\theta_i$ is an incident angle of the aiming beam 314 on the grating, and $\theta_m$ is the diffraction angle of the $m^{th}$ diffraction order. In some implementations, the cladding 304 may be etched (e.g., using one or more etching procedures) to cause the aiming beam entrance region 310 and/or the outer surface region 320 to comprise the plurality of notches 322.

As further shown in FIG. 3, the aiming beam 314 may emit from the aiming beam fiber 316 and may transmit (e.g., in free space) to the optical element 318, which may direct and/or focus the aiming beam 314 on the outer surface region 320 of the aiming beam entrance region 310. Accordingly, the aiming beam 314 may fall incident upon the aiming beam entrance region 310 and/or the outer surface region 320 at a first incidence angle.

When the first incidence satisfies (e.g., is less than or equal to) a first incidence angle threshold, the aiming beam entrance region 310 and/or the outer surface region 320 (e.g., comprising the plurality of notches 322) may cause the trajectory of the aiming beam 314 to change to allow the aiming beam 314 to enter into the cladding 304. This may cause the aiming beam 314 to propagate through the cladding 304 from the outer surface region 320 of the cladding 304 to an outer surface region 324 of the core 302. For example, as shown in FIG. 3, the aiming beam 314 may directly propagate through the cladding 304 from the outer surface region 320 of the cladding 304 to the outer surface region 324 of the core 302 without reflecting off one or more internal surface regions of the cladding 304. The aiming beam 314, after propagating through the cladding 304, may fall incident upon the outer surface region 324 of the core 302 at a second incidence angle. When the second incidence angle satisfies (e.g., is less than or equal to) a second incidence angle threshold, the aiming beam 314 may couple into the core 302. For example the aiming beam 314 may enter the core 302 (e.g., via the outer surface region 324) and may propagate within the core 302 with a propagation loss that satisfies (e.g., is less than or equal to) a propagation loss threshold (e.g., a leaky mode threshold). As further shown in FIG. 3, a leaked portion 326 of the aiming beam 314 may exit the core 302 when the aiming beam enters the core 302 and/or when the aiming beam 314 propagates within the core 302 (e.g., with the propagation loss).

In this way, the aiming beam 314 may be coupled into the core 302 to allow the aiming beam 314 to be transmitted via the core 302 with laser light (e.g., a high power beam) to an output end of the optical fiber 300. The aiming beam 314, along with the laser light, may emit from the output end of the optical fiber 300, which facilitates aiming of the laser light (e.g., since the laser light will include light in the visible spectrum). This can improve safety, precision, efficiency, and/or the like associated with using the optical fiber 300 in the material processing application.

As indicated above, FIG. 3 is provided as an example. Other examples may differ from what is described with regard to FIG. 3.

Figure 4:
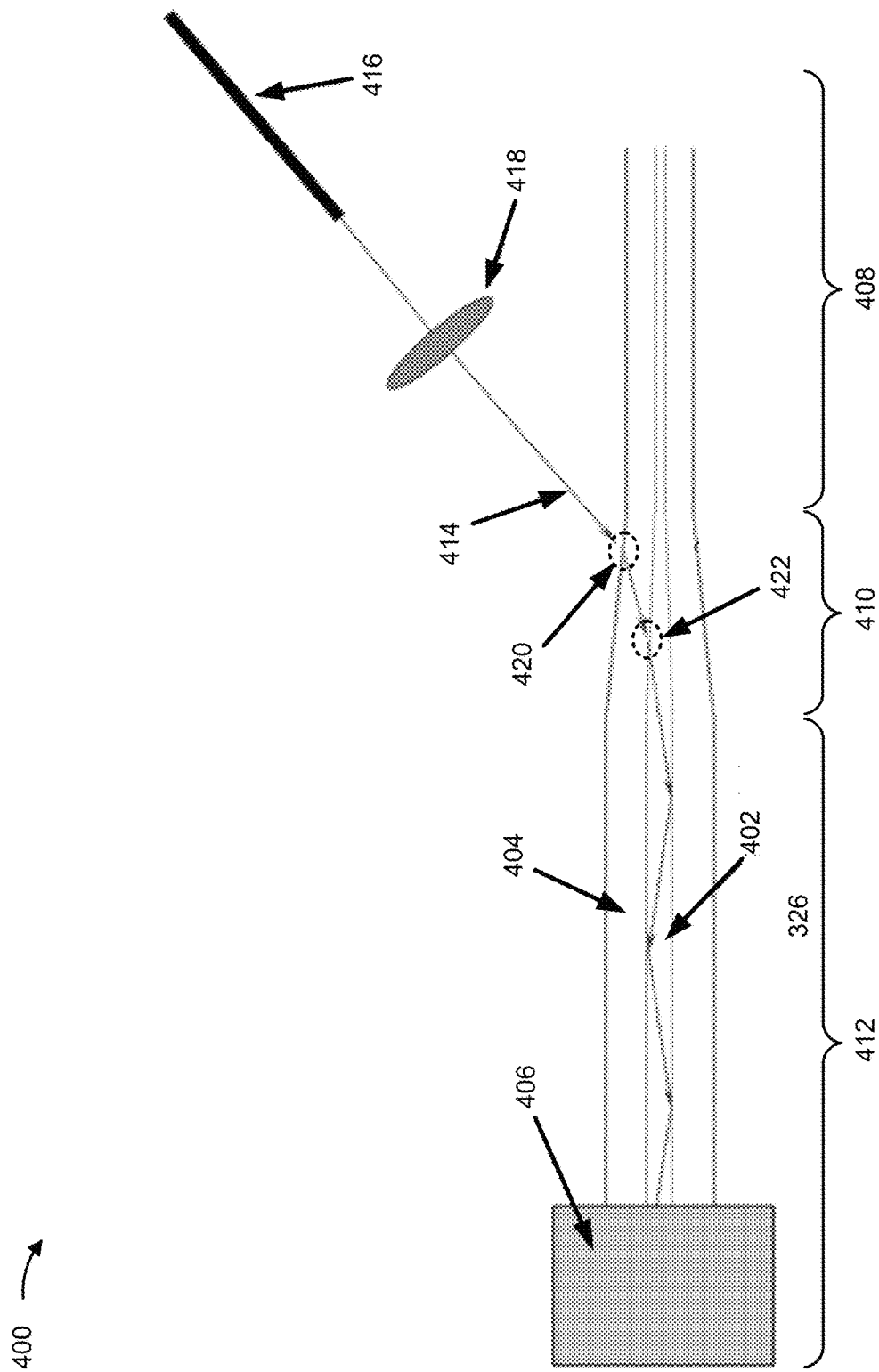
FIG. 4 is a diagram of an example optical fiber described herein.

FIG. 4 is a diagram of an example optical fiber 400 described herein. In some implementations, the optical fiber 400 may propagate laser light (e.g., in a similar manner as the optical fiber 100 described herein in relation to FIGS. 1A-1B). As shown in FIG. 4, the optical fiber 400 may include a core 402, a cladding 404, and/or a fiber jacket 406 that may respectively be the same as, or similar to, the core 102, the cladding 104, and/or the fiber jacket 106 described herein in relation to FIGS. 1A-1B. As further shown in FIG. 4, the optical fiber 400 may include an input end region 408, an aiming beam entrance region 410, and an output end region 412. Laser light may propagate within the core 402 from the input end region 408 to the output end region 412 via the aiming beam entrance region 410. The aiming beam entrance region 410 may be configured to cause an aiming beam 414 to couple into the core 402, as described in further detail herein.

An aiming beam fiber 416 (that is the same as, or similar to, the aiming beam fiber 116 described herein in relation to FIGS. 1A-1B) may be an optical fiber that is configured to emit the aiming beam 414 at the aiming beam entrance region 410. The aiming beam 414 may be a free space beam in the visible spectrum (e.g., that is the same as, or similar to, the aiming beam 114). In some implementations, the aiming beam fiber 416 may be configured to emit the aiming beam 414 at the aiming beam entrance region 410 via an optical element 418. The optical element 418 (e.g., that is the same as, or similar to, the optical element 418 described herein in relation to FIGS. 1A-1B) may comprise a lens or a similar optical element configured to direct and/or focus the aiming beam 414 on the aiming beam entrance region 410.

As further shown in FIG. 4, the aiming beam entrance region 410 may comprise an outer surface region 420 of the cladding 404. In some implementations, the aiming beam entrance region 410 and/or the outer surface region 420 may be tapered at a first taper angle (e.g., in a same, or similar, manner as the aiming beam entrance region 110 and/or the outer surface region 120 described herein in relation to FIGS. 1A-1B). For example, as shown in FIG. 4, a diameter of the cladding 404 may be at a maximum at a position on the cladding 404 associated with the output end region 412 and may progressively decrease (e.g., corresponding to the first taper angle) at one or more positions on the cladding 404 associated with the aiming beam entrance region 410 that are farther away from the output end region 412, with the diameter at a minimum at a position on the cladding 404 associated with the input end region 408. In some implementations, the aiming beam entrance region 410 may comprise an outer surface region 422 of the core 402, and the outer surface region 422 may be tapered at a second taper angle. For example, as shown in FIG. 4, a diameter of the core 402 may be at a maximum at a position on the core 402 associated with the output end region 412 and may progressively decrease (e.g., corresponding to the second taper angle) at one or more positions on the core 402 associated with the aiming beam entrance region 410 that are farther away from the output end region 412, with the diameter at a minimum at a position on the core 402 associated with the input end region 408. The second taper angle may match (e.g., be the same as, or similar to) the first taper angle, such that a difference between the first taper angle and the second taper angle satisfies (e.g., is less than or equal to) a threshold. In some implementations, the core 402 and/or the cladding 404 may be heated and/or pulled to cause the aiming beam entrance region 410 and/or the outer surface region 420 of the cladding 404 to be tapered at the first taper angle and the outer surface region 422 of the core 402 to be tapered at the second taper angle.

As further shown in FIG. 4, the aiming beam 414 may emit from the aiming beam fiber 416 and may transmit (e.g., in free space) to the optical element 418, which may direct and/or focus the aiming beam 414 on the outer surface region 420 of the aiming beam entrance region 410. Accordingly, the aiming beam 414 may fall incident upon the aiming beam entrance region 410 and/or the outer surface region 420 at a first incidence angle.

When the first incidence satisfies (e.g., is less than or equal to) a first incidence angle threshold, the aiming beam entrance region 410 and/or the outer surface region 420 (e.g., when tapered at the first taper angle) may cause the trajectory of the aiming beam 414 to change to allow the aiming beam 414 to enter into the cladding 404. This may cause the aiming beam 414 to propagate through the cladding 404 from the outer surface region 420 to the outer surface region 422 of the core 402. For example, as shown in FIG. 4A, the aiming beam 414 may directly propagate through the cladding 404 from the outer surface region 420 of the cladding 404 to the outer surface region 422 of the core 402 without reflecting off one or more internal surface regions of the cladding 404. The aiming beam 414, after propagating through the cladding 404, may fall incident upon the outer surface region 422 of the core 402 at a second incidence angle. When the second incidence angle satisfies (e.g., is less than or equal to) a second incidence angle threshold, the outer surface region 422 of the core 402 (e.g., when tapered at the second taper angle) may cause the trajectory of the aiming beam 414 to change to allow the aiming beam 414 to couple into the core 402. For example the aiming beam 414 may enter the core 402 (e.g., via the outer surface region 422) and may propagate within the core 402 via TIR or may propagate within the core 402 with a propagation loss that satisfies (e.g., is less than or equal to) a propagation loss threshold (e.g., a leaky mode threshold).

In this way, the aiming beam 414 may be coupled into the core 402 to allow the aiming beam 414 to be transmitted via the core 402 with laser light (e.g., a high power beam) to an output end of the optical fiber 400. The aiming beam 414, along with the laser light, may emit from the output end of the optical fiber 400, which facilitates aiming of the laser light (e.g., since the laser light will include light in the visible spectrum). This can improve safety, precision, efficiency, and/or the like associated with using the optical fiber 400 in the material processing application.

As indicated above, FIG. 4 is provided as an example. Other examples may differ from what is described with regard to FIG. 4.

FIGS. 5A-5F are diagrams of an example optical fiber system 500 described herein. In some implementations, the optical fiber system 500 may propagate and/or combine laser light, such as one or more high-power beams associated with a kW laser, that is to be used in a material processing application, such as cutting, welding, engraving, marking, and/or the like. As shown in FIGS. 5A-5F, the optical fiber system 500 may include one or more input optical fibers 502, a transmission optical fiber 504, and an output optical fiber 506. The one or more input optical fibers 502 may be configured to cause one or more input beams to propagate to the transmission optical fiber 504 via respective cores of the one or more input optical fibers 502. The transmission optical fiber 504 may be configured to cause the one or more input beams to propagate as a transmission beam (e.g., by combining the one or more input beams into the transmission beam) to the output optical fiber 506 via a core of the transmission optical fiber 504. The output optical fiber 506 may be configured to cause the transmission beam to propagate to an emission end of the output optical fiber 506 (e.g., to allow the transmission beam to be emitted for use in the material processing application) via a core of the output optical fiber 506.

As shown in FIGS. 5A-5F, an aiming beam fiber 508 (e.g., that is the same as, or similar to, the aiming beam fiber 116, the aiming beam fiber 216, the aiming beam fiber 316, or the aiming beam fiber 416 described herein) may be configured to emit an aiming beam 510 (e.g., a free space beam in the visible spectrum) at an aiming beam entrance region 512 (e.g., via an optical element, not shown) that is associated with a particular optical fiber of the one or more input optical fibers 502, the transmission optical fiber 504, and the output optical fiber 506. Accordingly, the particular optical fiber may be the same as, or similar to, the optical fiber 100, the optical fiber 200, the optical fiber 300, or the optical fiber 400 described herein. The aiming beam entrance region 512 may be configured to cause the aiming beam 510 to couple into a core of the particular optical fiber (e.g., in a similar manner as that described herein in relation to FIGS. 1A-1B, 2A-2B, 3, and/or 4).

As shown in FIGS. 5A-5B, the aiming beam entrance region 512 may be associated with the transmission optical fiber 504. Accordingly, the aiming beam fiber 508 may be positioned relative to the transmission optical fiber 504 to cause the aiming beam fiber 508 to emit the aiming beam 510 at the aiming beam entrance region 512 to cause the aiming beam 510 to fall incident upon the aiming beam entrance region 512 at an incidence angle that allows the aiming beam 510 to enter a cladding of the transmission optical fiber 504, propagate through the cladding, and couple into the core of the transmission optical fiber 504 (e.g., in a similar manner as that described herein in relation to FIGS. 1A-1B, 2A-2B, 3, and 4). The aiming beam 510 may then propagate (e.g., with a transmission beam) within the core of the transmission optical fiber 504 to the core of the output optical fiber 506, may propagate (e.g., with the transmission beam) within the core of the output optical fiber 506 to an emission end of the output optical fiber 506, and may emit (e.g., with the transmission beam) from the emission end of the output optical fiber 506. This facilitates aiming of the transmission beam (e.g., since the transmission beam emits with the aiming beam). This can improve safety, precision, efficiency, and/or the like associated with using the optical fiber system 500 in the material processing application.

Figure 5C:
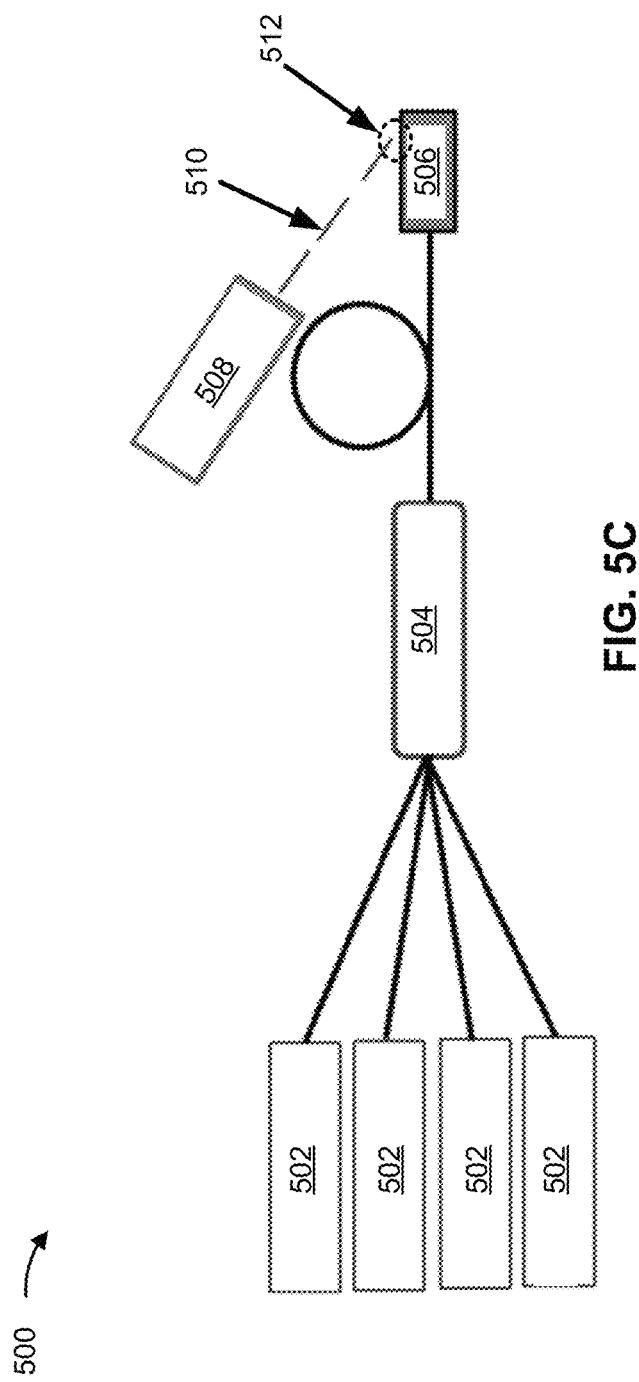
Figure 5D:
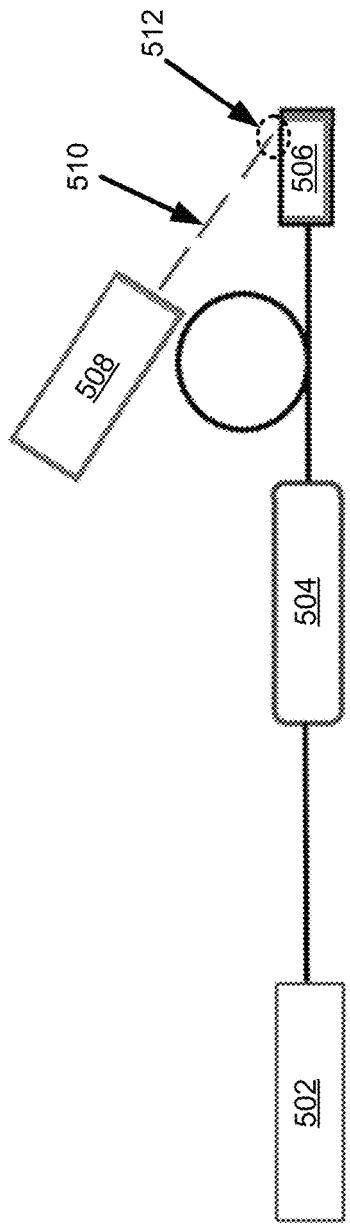

As shown in FIGS. 5C-5D, the aiming beam entrance region 512 may be associated with the output optical fiber 506. Accordingly, the aiming beam fiber 508 may be positioned relative to the output optical fiber 506 to cause the aiming beam fiber 508 to emit the aiming beam 510 at the aiming beam entrance region 512 to cause the aiming beam 510 to fall incident upon the aiming beam entrance region 512 at an incidence angle that allows the aiming beam 510 to enter a cladding of the output optical fiber 506, propagate through the cladding, and couple into the core of the output optical fiber 506 (e.g., in a similar manner as that described herein in relation to FIGS. 1A-1B, 2A-2B, 3, and 4). The aiming beam 510 may then propagate (e.g., with a transmission beam) within the core of the output optical fiber 506 to an emission end of the output optical fiber 506 and may emit (e.g., with the transmission beam) from the emission end of the output optical fiber 506. This facilitates aiming of the transmission beam (e.g., since the transmission beam emits with the aiming beam). This can improve safety, precision, efficiency, and/or the like associated with using the optical fiber system 500 in the material processing application.

Figure 5E:
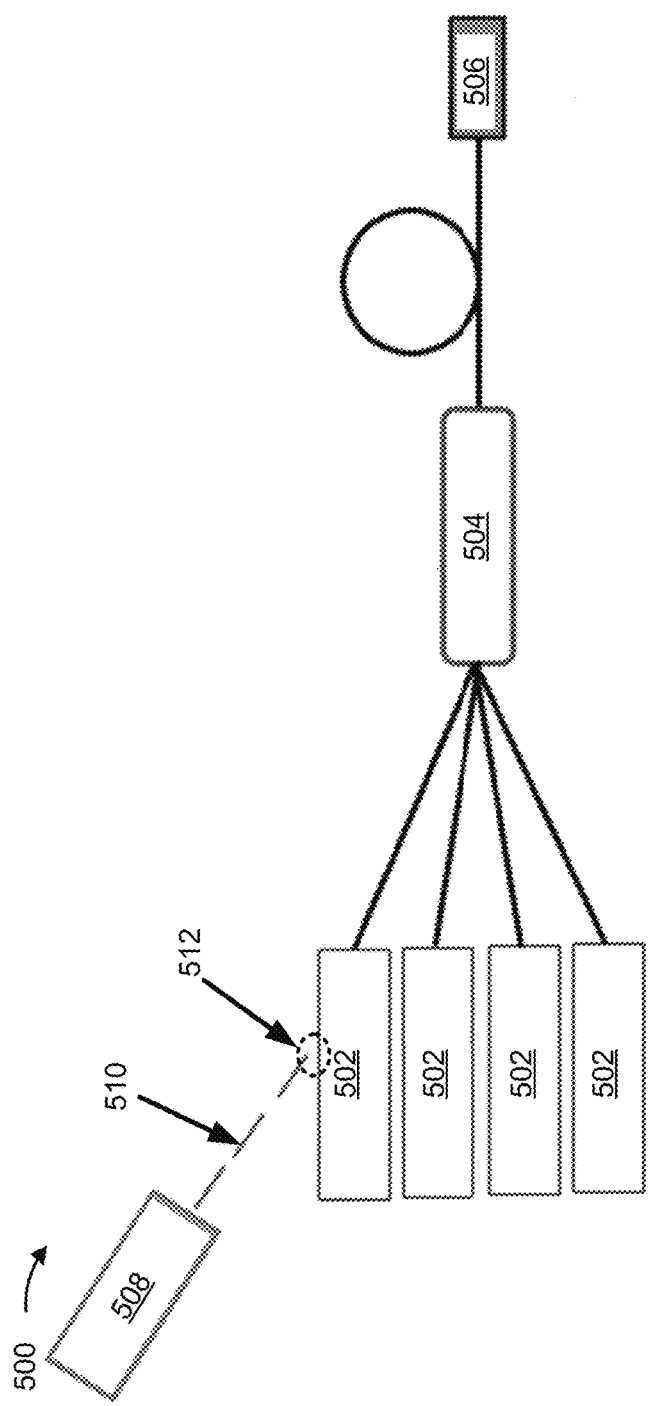
Figure 5F:
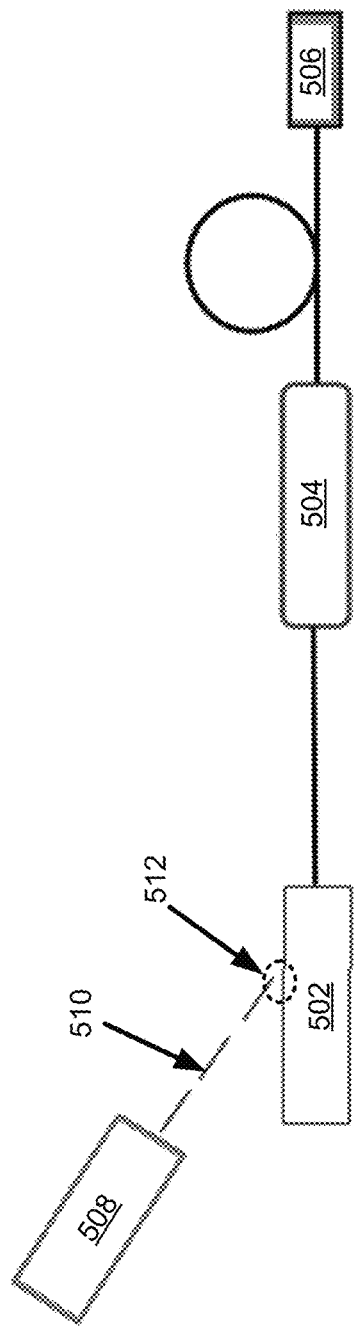

As shown in FIGS. 5E-5F, the aiming beam entrance region 512 may be associated with an input optical fiber 502 of the one or more input optical fibers 502. Accordingly, the aiming beam fiber 508 may be positioned relative to the input optical fiber 502 to cause the aiming beam fiber 508 to emit the aiming beam 510 at the aiming beam entrance region 512 to cause the aiming beam 510 to fall incident upon the aiming beam entrance region 512 at an incidence angle that allows the aiming beam 510 to enter a cladding of the input optical fiber 502, propagate through the cladding, and couple into the core of the input optical fiber 502 (e.g., in a similar manner as that described herein in relation to FIGS. 1A-1B, 2A-2B, 3, and 4). The aiming beam 510 may then propagate (e.g., with an input beam) within the core of the input optical fiber 502 to the core of the transmission optical fiber 504, may propagate (e.g., with a transmission beam comprising the input beam) within the core of the transmission optical fiber 504 to the core of the output optical fiber 506, may propagate (e.g., with the transmission beam) within the core of the output optical fiber 506 to an emission end of the output optical fiber 506, and the aiming beam 510 may emit (e.g., with the transmission beam) from the emission end of the output optical fiber 506. This facilitates aiming of the transmission beam (e.g., since the transmission beam emits with the aiming beam). This can improve safety, precision, efficiency, and/or the like associated with using the optical fiber system 500 in the material processing application.

As indicated above, FIGS. 5A-5F are provided as an example. Other examples may differ from what is described with regard to FIGS. 5A-5F.

Figure 6:
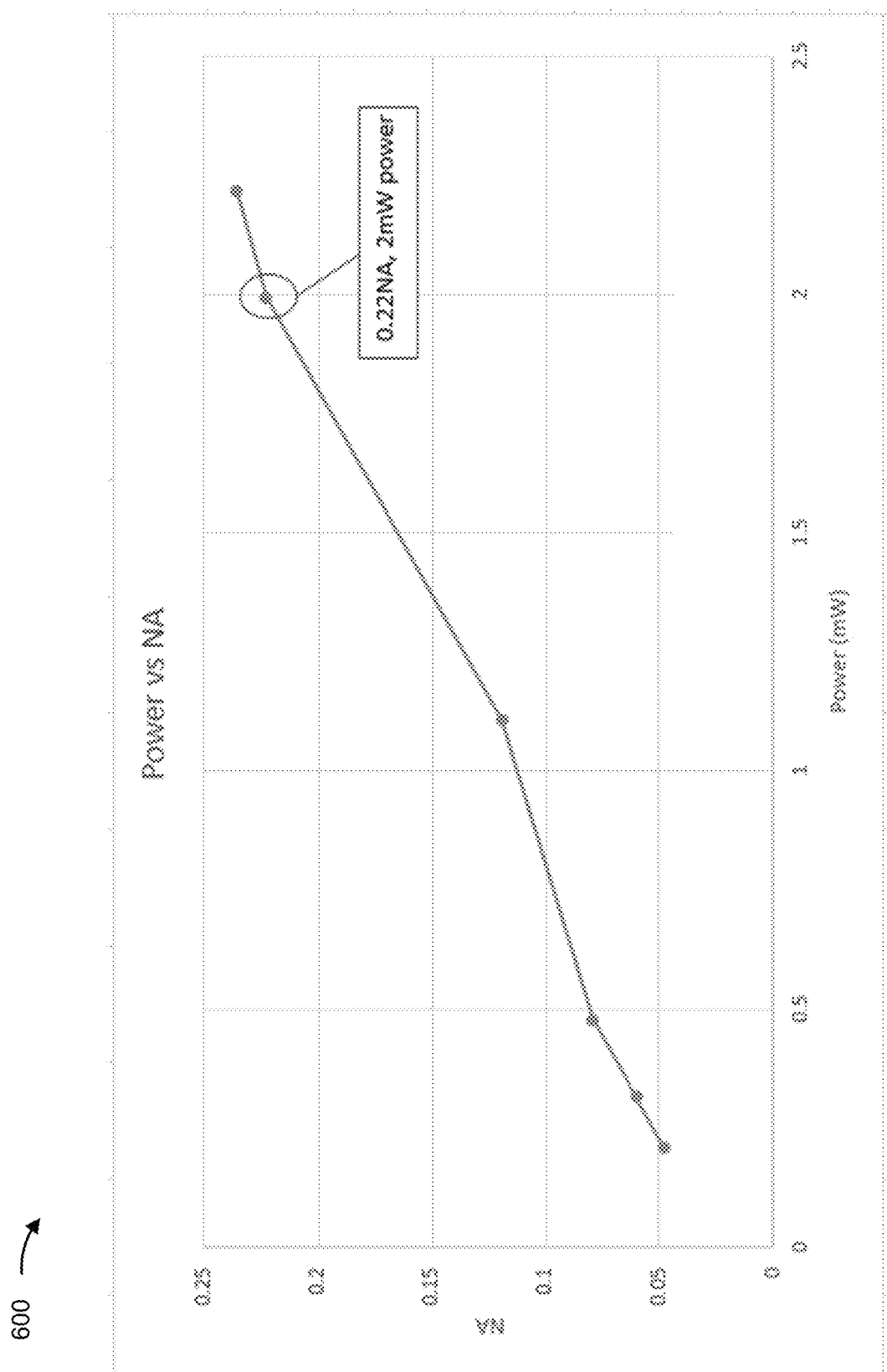
FIG. 6 is a diagram of an example plot illustrating an amount of power of an aiming beam that has coupled into a core of an optical fiber described herein.

FIG. 6 is a diagram of an example plot 600 illustrating an amount of power (e.g., in milliwatts (mW)) of an aiming beam (e.g., a red aiming beam) that has coupled into a core of an optical fiber described herein (e.g., the optical fiber 100, the optical fiber 200, the optical fiber 300, or the optical fiber 400, the input optical fiber 502, the transmission optical fiber 504, or the output optical fiber 506). In this example, an aiming beam fiber (e.g., the aiming beam fiber 116, the aiming beam fiber 216, the aiming beam fiber 316, the aiming beam fiber 416, or the aiming beam fiber 508) emits an aiming beam with approximately 62.2 mW of power that couples into the core of the optical fiber (e.g., in a similar manner as that described herein in relation to FIGS. 1A-1B, 2A-2B, 3, 4, and/or 5A-5F). As shown in FIG. 6, a power of the aiming beam, after the aiming beam has coupled into the core of the optical fiber, has a positive relationship with the NA of the optical fiber. For example, the aiming beam has approximately 0.25 mW of power when the NA is approximately 0.05, and the aiming beam has approximately 2 mW of power when the NA is approximately 0.22 (e.g., which corresponds to the NA of optical fiber 100, as shown in FIG. 1B, and to the NA of optical fiber 200, as shown in FIG. 2B).

As indicated above, FIG. 6 is provided as an example. Other examples may differ from what is described with regard to FIG. 6.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical fiber, comprising:
   a core configured to transmit laser light; and
   a cladding that surrounds the core, wherein:
      an outer surface region of the cladding is tapered, and wherein the outer surface region of the cladding is configured to:
         cause an aiming beam that falls incident upon the outer surface region of the cladding at a first incidence angle to fall incident upon an outer surface region of the core at a second incidence angle to allow the aiming beam to couple into the core.

2. The optical fiber of claim 1, wherein the outer surface region of the cladding comprises a plurality of notches arranged in a periodic pattern.

3. The optical fiber of claim 2, wherein a period of the periodic pattern is in a range of 10 to 1000 microns.

4. The optical fiber of claim 1, wherein the outer surface region of the cladding is tapered at a first taper angle and the outer surface region of the core is tapered at a second taper angle.

5. The optical fiber of claim 4, wherein a difference between the first taper angle and the second taper angle satisfies a threshold.

6. The optical fiber of claim 1, wherein the outer surface region of the cladding is further configured to:
cause, based on the first incidence angle satisfying a first incidence angle threshold, the aiming beam to enter the cladding; and
cause, based on an index of refraction of the cladding, the aiming beam to bend when entering the cladding.

7. The optical fiber of claim 1, wherein the outer surface region of the cladding is further configured to:
cause the aiming beam to directly propagate through the cladding from the outer surface region of the cladding to the outer surface region of the core.

8. The optical fiber of claim 1, wherein the outer surface region of the cladding is further configured to:
cause the aiming beam to indirectly propagate through the cladding from the outer surface region of the cladding to the outer surface region of the core.

9. The optical fiber of claim 1, wherein allowing the aiming beam to couple into the core comprises allowing the aiming beam to propagate within the core with a propagation loss that satisfies a propagation loss threshold.

10. An optical fiber, comprising:
a core configured to transmit laser light; and
a cladding that surrounds the core, wherein:
an outer surface region of the cladding comprises a plurality of notches arranged in a periodic pattern, and
wherein the outer surface region of the cladding is configured to:
cause an aiming beam that falls incident upon the outer surface region of the cladding at a first incidence angle to fall incident upon an outer surface region of the core at a second incidence angle to allow the aiming beam to couple into the core.

11. The optical fiber of claim 10, wherein a period of the periodic pattern is in a range of 10 to 1000 microns.

12. The optical fiber of claim 10, wherein the outer surface region of the cladding is tapered.

13. The optical fiber of claim 10, wherein the outer surface region of the cladding is tapered at a first taper angle and the outer surface region of the core is tapered at a second taper angle,
wherein a difference between the first taper angle and the second taper angle satisfies a threshold.

14. The optical fiber of claim 10, wherein the outer surface region of the cladding is further configured to:
cause, based on the first incidence angle satisfying a first incidence angle threshold, the aiming beam to enter the cladding; and
cause, based on a period of the periodic pattern, the aiming beam to bend when entering the cladding.

15. The optical fiber of claim 10, wherein the outer surface region of the cladding is further configured to:
cause the aiming beam to directly propagate through the cladding from the outer surface region of the cladding to the outer surface region of the core.

16. The optical fiber of claim 10, wherein allowing the aiming beam to couple into the core comprises allowing the aiming beam to propagate within the core with a propagation loss that satisfies a propagation loss threshold.

17. An optical fiber system, comprising:
one or more input optical fibers;
a transmission optical fiber;
an output optical fiber;
an aiming beam fiber;
an aiming beam entrance region; and
an optical element, wherein:
the one or more input optical fibers are configured to cause one or more input beams to propagate to the transmission optical fiber via respective cores of the one or more input optical fibers;
the transmission optical fiber is configured to cause the one or more input beams to propagate as a transmission beam to the output optical fiber via a core of the transmission optical fiber;
the output optical fiber is configured to cause the transmission beam to propagate to an emission end of the output optical fiber via a core of the output optical fiber;
the aiming beam fiber is configured to emit an aiming beam at the aiming beam entrance region via the optical element;
the optical element is configured to focus the aiming beam on the aiming beam entrance region; and
the aiming beam entrance region is tapered or comprises a plurality of notches arranged in a periodic pattern,
wherein the aiming beam entrance region is configured to cause the aiming beam to couple into at least one of the respective cores of the one or more input optical fiber, the core of the transmission optical fiber, or the core of the output optical fiber to allow the aiming beam to propagate to the emission end of the output optical fiber.

18. The optical fiber system of claim 17, wherein the aiming beam entrance region is an outer surface region of a cladding of at least one input optical fiber of the one or more input optical fibers.

19. The optical fiber system of claim 17, wherein the aiming beam entrance region is an outer surface region of a cladding of the transmission optical fiber.

20. The optical fiber system of claim 17, wherein the aiming beam entrance region is an outer surface region of a cladding of the output optical fiber.

* * * * *